United States Patent
Bonaccorso et al.

(10) Patent No.: US 11,713,031 B2
(45) Date of Patent: Aug. 1, 2023

(54) MANAGEMENT OF THE CLEANING OF FRICTION BODIES OF AUTOMOTIVE BRAKING SYSTEMS

(71) Applicant: FCA ITALY S.P.A., Turin (IT)

(72) Inventors: Gabriele Bonaccorso, Turin (IT); Luca Enrico, Turin (IT); Renato Badino, Turin (IT); Michele Ieluzzi, Turin (IT); Michele Galbusera, Turin (IT)

(73) Assignee: FCA ITALY S.p.A., Turin (IT)

( * ) Notice: Subject to any disclaimer, the term of this patent is extended or adjusted under 35 U.S.C. 154(b) by 364 days.

(21) Appl. No.: 17/043,947

(22) PCT Filed: Mar. 19, 2020

(86) PCT No.: PCT/IB2020/052546
§ 371 (c)(1),
(2) Date: Sep. 30, 2020

(87) PCT Pub. No.: WO2020/188520
PCT Pub. Date: Sep. 24, 2020

(65) Prior Publication Data
US 2021/0094546 A1  Apr. 1, 2021

(30) Foreign Application Priority Data

Mar. 20, 2019  (EP) .................................... 19164119
May 31, 2019  (EP) .................................... 19177752

(51) Int. Cl.
*B60T 17/22* (2006.01)
*B60T 1/10* (2006.01)
(Continued)

(52) U.S. Cl.
CPC .............. *B60T 17/221* (2013.01); *B60L 7/26* (2013.01); *B60T 1/10* (2013.01); *B60T 8/17* (2013.01);
(Continued)

(58) Field of Classification Search
CPC . B60T 1/10; B60T 7/12; B60T 13/586; B60T 17/221; B60T 2270/604;
(Continued)

(56) References Cited

U.S. PATENT DOCUMENTS 9,221,450 B2   12/2015  Borchers et al.
2004/0130211 A1 *  7/2004  Fagergren ............... B60T 8/267
                                                       303/191
(Continued)

FOREIGN PATENT DOCUMENTS

DE   102015220567 A1 *  4/2017
DE   102016007436 A1 * 12/2017
(Continued)

OTHER PUBLICATIONS

EPO machine translation of JP 2007-062457 A with appended English abstract (original JP document published Mar. 15, 2007) (Year: 2007).*
(Continued)

*Primary Examiner* — David A Testardi
(74) *Attorney, Agent, or Firm* — Harness, Dickey & Pierce, P.L.C.

(57) ABSTRACT

Hybrid or fully electric vehicle comprising: a conventional braking system based on friction bodies to brake the motor vehicle by interaction of the friction bodies in response to the operation of a brake pedal or any other equivalent control member, a reversible electric machine operatively coupled to the wheels of the vehicle and electronically controllable to operate selectively as an electric engine to generate a mechanical power to propel to the vehicle and as an electric generator to convert the kinetic energy of the motor vehicle into electrical energy, and an automotive electronic control system comprising a sensory system to measure automotive quantities, and an electronic control unit to control operation (Continued)

of the conventional braking system and of the electric machine in response to the operation of the brake pedal or any other operationally equivalent control member. The electronic control unit is further configured to control operation of: the electric machine to selectively perform one or more functions including regenerative braking, in which the electric machine is operated as an electric generator to recover the kinetic energy of the motor vehicle during braking and convert it into electrical energy, and the conventional braking system to clean the friction bodies of the conventional braking system based on the number of brakings performed by the conventional braking system and counted starting from the start-up of the motor vehicle.

9 Claims, 2 Drawing Sheets

(51) Int. Cl.
| | | |
|---|---|---|
| B60W 30/18 | (2012.01) | |
| B60L 7/26 | (2006.01) | |
| B60T 8/17 | (2006.01) | |
| B60W 10/08 | (2006.01) | |
| B60W 10/184 | (2012.01) | |
| B60W 20/00 | (2016.01) | |
| F16D 65/00 | (2006.01) | |

(52) U.S. Cl.
CPC .......... *B60W 10/08* (2013.01); *B60W 10/184* (2013.01); *B60W 20/00* (2013.01); *B60W 30/18109* (2013.01); *B60W 30/18127* (2013.01); *F16D 65/0037* (2013.01); *B60T 2201/124* (2013.01); *B60T 2270/604* (2013.01); *B60W 2510/18* (2013.01); *B60W 2510/244* (2013.01); *B60W 2530/00* (2013.01); *B60W 2530/18* (2013.01); *B60W 2540/06* (2013.01); *B60W 2540/12* (2013.01); *B60W 2540/18* (2013.01); *B60W 2710/08* (2013.01); *B60W 2710/18* (2013.01); *B60Y 2200/91* (2013.01); *B60Y 2200/92* (2013.01)

(58) Field of Classification Search
CPC .... F16D 65/0037; B60L 7/26; B60L 15/2009; B60W 30/18127
See application file for complete search history.

(56) References Cited

U.S. PATENT DOCUMENTS

| | | | |
|---|---|---|---|
| 2013/0023382 A1* | 1/2013 | Ljungdahl | F16D 65/0037 477/185 |
| 2013/0151103 A1* | 6/2013 | Enders | B60L 7/18 701/70 |
| 2014/0229045 A1* | 8/2014 | Borchers | F16D 61/00 701/22 |
| 2017/0066442 A1* | 3/2017 | Woodley | B60W 10/06 |
| 2017/0259671 A1* | 9/2017 | Kim | B60T 7/042 |
| 2018/0251103 A1* | 9/2018 | Satterthwaite | F16D 66/022 |
| 2019/0359190 A1* | 11/2019 | Frenzel | B60G 17/019 |
| 2020/0079219 A1* | 3/2020 | Okubo | B60L 7/26 |
| 2020/0156614 A1* | 5/2020 | Choi | B60T 17/221 |
| 2021/0323413 A1* | 10/2021 | Kang | F16D 65/0037 |
| 2022/0212645 A1* | 7/2022 | Gunselmann | B60T 8/172 |

FOREIGN PATENT DOCUMENTS

| | | | |
|---|---|---|---|
| DE | 102016217680 A1 * | 3/2018 | |
| DE | 102016217681 A1 | 3/2018 | |
| EP | 2718157 B1 | 10/2017 | |
| GB | 2498794 A * | 7/2013 | ............... B60T 1/10 |
| JP | 2006103630 A * | 4/2006 | |
| JP | 2006143104 A | 6/2006 | |
| JP | 2007062457 A * | 3/2007 | |
| JP | 2008120147 A * | 5/2008 | |
| JP | 2012126287 A * | 7/2012 | ............... B60T 1/10 |
| JP | 2012126288 A * | 7/2012 | |

OTHER PUBLICATIONS

EPO machine translation of JP 2012-126287 A (original JP document published Jul. 5, 2012) (Year: 2012).*
International Search Report and Written Opinion of the ISA issued in PCT/IB2020/052546, dated Jun. 9, 2020; ISA/EP.

* cited by examiner

MANAGEMENT OF THE CLEANING OF FRICTION BODIES OF AUTOMOTIVE BRAKING SYSTEMS

CROSS-REFERENCE TO RELATED PATENT APPLICATIONS

This application is a U.S. National Phase Application under 35 U.S.C. 371 of International Application No. PCT/IB2020/052546, filed on Mar. 19, 2020, which claims the benefit of European patent application No. 19164119.0 filed on Mar. 20, 2019 and European patent application No. 19177752.3 filed on May 31, 2019. The entire disclosures of the above-identified applications are incorporated herein by reference.

TECHNICAL FIELD OF THE INVENTION

The present invention relates in general to the field of motor vehicles with (fully) electric propulsion, also known as battery electric vehicles (BEVs), namely motor vehicles with only electric engines powered by electric batteries, and to the field of hybrid propulsion vehicles, namely with an internal combustion engine and an electric engine, of a traditional type, in which the electric batteries are electrically rechargeable with the aid of the internal combustion engines, and of the so-called plug-in (PHEV—Plug-in Hybrid Electric Vehicle) type, in which the electric batteries are electrically rechargeable even without the aid of the internal combustion engines, by using external electrical energy sources electrically connectable to the electric batteries through wired or wireless connections.

The present invention relates in particular to the so-called regeneration of the conventional automotive braking systems, which regeneration consists in cleaning the friction bodies of the conventional automotive braking systems aimed at getting rid of, or mitigating the negative effects on the braking performance or efficiency and on the service life of the conventional automotive braking systems due to, dirt and rust of the friction bodies of the conventional automotive braking systems.

The present invention finds application in any type of road motor vehicle, whether it is used to transport people, such as cars, buses, camper vans, etc., or to transport goods, such as industrial vehicles (lorries, trucks, articulated vehicles, etc.) or light or medium-heavy commercial vehicles (vans, trucks, cabin cruisers, etc.).

STATE OF THE ART

As is known, internal combustion motor vehicles are equipped with a braking mechanism provided by conventional automotive braking systems, which convert the kinetic energy of motor vehicles into heat by means of friction bodies in the form of brake pads, brake discs, brake drums.

In particular, conventional automotive braking systems comprise a service brake, which is traditionally hydraulic and acts on all four motor vehicle wheels in response to foot-operation of a brake pedal.

The service brake essentially comprises four braking assemblies, each associated with a respective motor vehicle wheel, and a hydraulic circuit or two separate hydraulic circuits, respectively associated with the front and rear braking assemblies, to supply pressurized oil to the braking assemblies to operate the same.

Braking assemblies can be of the drum type, simpler and cheaper and for this reason mainly used only on small motor vehicles in association with the rear wheels, for economic reasons and because of the reduced mass of the motor vehicles, which does not oblige to use high-performance braking assemblies, or of the disc type, which have now replaced drum braking assemblies for years.

In drum braking assemblies, braking is due to the action on one drum of one or more friction members, called brake shoes, whereas in disc braking assemblies braking is due to the action on a brake disc of two friction members, called brake pads, arranged on opposite sides of the brake disc and carried by a floating brake caliper.

In particular, in a disc brake, the brake disc is rotatably supported by an upright designed to be coupled to a motor vehicle suspension and is fixed and coaxial with respect to the relative wheel, while the brake caliper is slidably coupled to two studs or pins so as to float parallel to the wheel axis when one of the two brake pads is subjected to the thrust of a hydraulic actuation cylinder which is part of the brake caliper.

Conventional automotive braking systems also comprise a parking brake, which is traditionally mechanical or, usually in recent motor vehicles of medium-high category, electric, and acts only on two of the motor vehicle wheels, in particular the rear ones, in response to the manual operation of either a brake lever, in mechanical parking brakes, or an electric switch, usually in combination with foot-operation of a brake pedal, in electric parking brakes.

Hybrid vehicles and fully electric vehicles are instead equipped with two different braking mechanisms: in addition to the braking mechanism provided by conventional automotive braking systems, these vehicles are in fact equipped with an additional braking mechanism provided by the reversible electric machines that are mechanically coupled to the motor vehicle wheels and operable as:
  electric engines to generate mechanical power, which are transmitted to the wheels of the motor vehicles to propel the motor vehicles and which, in hybrid vehicles, may be additional or alternative to the power generated by internal combustion engines, depending on their greater or lesser electric power (mild hybrid vs. classic hybrid), and
  electric generators to carry out the so-called regenerative braking or energy recovery, during which the kinetic energy of motor vehicles during braking is converted into electrical energy, which is then stored in electrical energy accumulators (batteries) of the motor vehicles to be then subsequently exploited by electric machines when operating as electric engines to provide propulsion to motor vehicles.

For example, in mild hybrid vehicles, the reversible electric machine comprises a reversible alternator, more commonly known as a Belt-driven Starter Generator (BSG), which is coupled to the motor shaft of the internal combustion engine of the motor vehicle by means of a belt and is an electronically-controllable motor-generator to selectively operate as an electric engine to generate an additional mechanical torque to the one generated by the internal combustion engine, and as a traditional alternator to generate electrical energy.

In order to recover energy and optimize of the motor vehicle energy balance, the braking mechanism provided by the reversible electric machines during regenerative braking is exploited whenever allowed by the operating conditions of the motor vehicles, for example in urban or suburban areas, so resulting in it being used more frequently than the one provided by conventional automotive braking systems.

As a result, the friction bodies of conventional automotive braking systems of hybrid or fully electric vehicles are subjected to dirt and rust to a greater extent than those of the motor vehicles with internal combustion engines, where the braking mechanism of the conventional automotive braking systems is the only one available and, consequently, the only one used to perform any braking.

The greater incidence of dirt and rust of the friction bodies in general, and of the brake discs in particular, of conventional braking systems negatively affects both the braking performance or efficiency and the service life of conventional braking systems.

EP 2 718 157 B1 and DE 10 2015 220 567 A1 disclose two solution that aim to overcome this drawback.

In particular, EP 2 718 157 B1 discloses determining the state of the braking system of the motor vehicle, detecting the degree of operation of the brake pedal of the motor vehicle, and adjusting the braking pressure of the braking system and the energy recovery carried out by the electric machine depending on the state of the braking system and the degree of operation of the brake pedal. The state of the braking system is determined as the reduction in the breaking effect of the braking system caused by dirt or rust of the friction bodies of the braking system. The braking pressure of the braking system and the energy recovery carried out by the electric machine is adjusted by increasing the ratio between the braking pressure and the energy recovery as the reduction in the breaking effect of the braking system increases.

DE 10 2015 220 567 A1 discloses a method of cleaning the brake discs of a motor vehicle designed to carry out regenerative braking, in which, in the presence of a series of side conditions, the brake pads of the motor vehicle are slightly applied to the brake discs, although this is not necessary for decelerating the motor vehicle. In particular, the application of the brake pads to the brake discs is performed only in the presence of a deceleration request of the motor vehicle in which the share of energy recovery from braking or slowing down of the motor vehicle is reduced to such an extent that the desired slowing down of the motor vehicle is obtained from the sum of the slowdown rate due to the application of the brake pads on the brake discs and of a suitably set slowdown rate due to the energy recovery.

OBJECT AND SUMMARY OF THE INVENTION

The Applicant has found that the previously-described prior art solutions, regardless of whether or not they allow the drawbacks they intend to remedy to be overcome, have a certain degree of complexity at least from the point of view of the logics of management of the operations of the braking mechanism, whose implementation consequently entails a significant exploitation of the computational resources of either the on-board computers or the electronic control units of the motor vehicles.

The aim of the present invention is therefore to develop a strategy for cleaning the friction bodies of the automotive braking systems that allows mitigating the negative effects on the braking performance and on the service life of the conventional automotive braking systems due to the greater incidence of dirt and rust of the friction bodies of the conventional automotive braking systems and that is computationally simpler than the previously-described prior art solutions, so as to have a lower impact on the exploitation of the computational resources of either the on-board computers or the electronic control units of the motor vehicles compared to the prior art solutions.

Broadly speaking, the basic idea of the present invention is to develop a strategy for cleaning the friction bodies of the braking system that is preventive rather than corrective like the previously-described prior art solutions.

For this reason, the present invention provides for cleaning of the friction bodies of conventional automotive braking systems basically based on the number of brakings performed by conventional automotive braking systems and counted from the start-up of the motor vehicles. These operating conditions can be conveniently determined based on key-off to key-on transitions of the motor vehicles or in any other available way capable of providing the same information.

The present invention therefore does not make use of complex estimation models, which are in turn based on measured or estimated automotive or environmental quantities such as the temperature of the brake discs or the external humidity, and which show significant limitations mainly due to the fact that they often do not take into account actual data on the external environment, such as the external temperature or the local humidity or the proximity to salt water.

The present invention also does not make use of estimation models of the brake disc oxidation, which have significant limitations and the use of which is likely to lead to a corrective strategy rather than to a preventive strategy. In this case, in fact, the driver would drive with a non-optimized regenerative braking system without any advantage in terms of energy savings or limitation of intrusiveness in terms of frequency and intensity of operation.

According to the present invention, an automotive electronic control system for a hybrid or fully electric vehicle, a hybrid or fully electric vehicle equipped with such an automotive electronic control system, and a software for such an automotive electronic control system are provided, as claimed in the appended claims.

DETAILED DESCRIPTION OF PREFERRED EMBODIMENTS OF THE INVENTION

The present invention will now be described in detail with reference to the attached figures to allow a person skilled in the art to reproduce and use it. Various modifications to the described embodiments will be immediately apparent to the persons skilled in the art. The generic principles described can be applied to other embodiments and applications without departing from the scope of protection of the present invention as claimed in the attached claims.

Therefore, the present invention should not be considered limited to the described and illustrated embodiments, but it must be accorded the widest protective scope in accordance with the described and claimed features.

Where not defined otherwise, all the technical and scientific terms used herein have the same meaning commonly used by the persons skilled in art pertaining to the present invention. In the event of a contention, this description, including the definitions provided, will be binding. Furthermore, the examples are provided for illustrative purposes only and as such should not be considered limiting.

In particular, the block diagrams included in the attached figures and described below are not intended as a representation of structural features or constructive limitations, but they must be considered as a representation of functional features, i.e., intrinsic properties of the devices defined by the obtained effects, namely functional limitations, which can be implemented in different ways to protect the functionalities of the same (working ability).

In order to facilitate the understanding of the embodiments described herein, reference will be made to some specific embodiments and a specific language will be used to describe the same. The language used in the present description has the purpose of describing only particular embodiments, and is not intended to limit the scope of the present invention.

Figure 1:
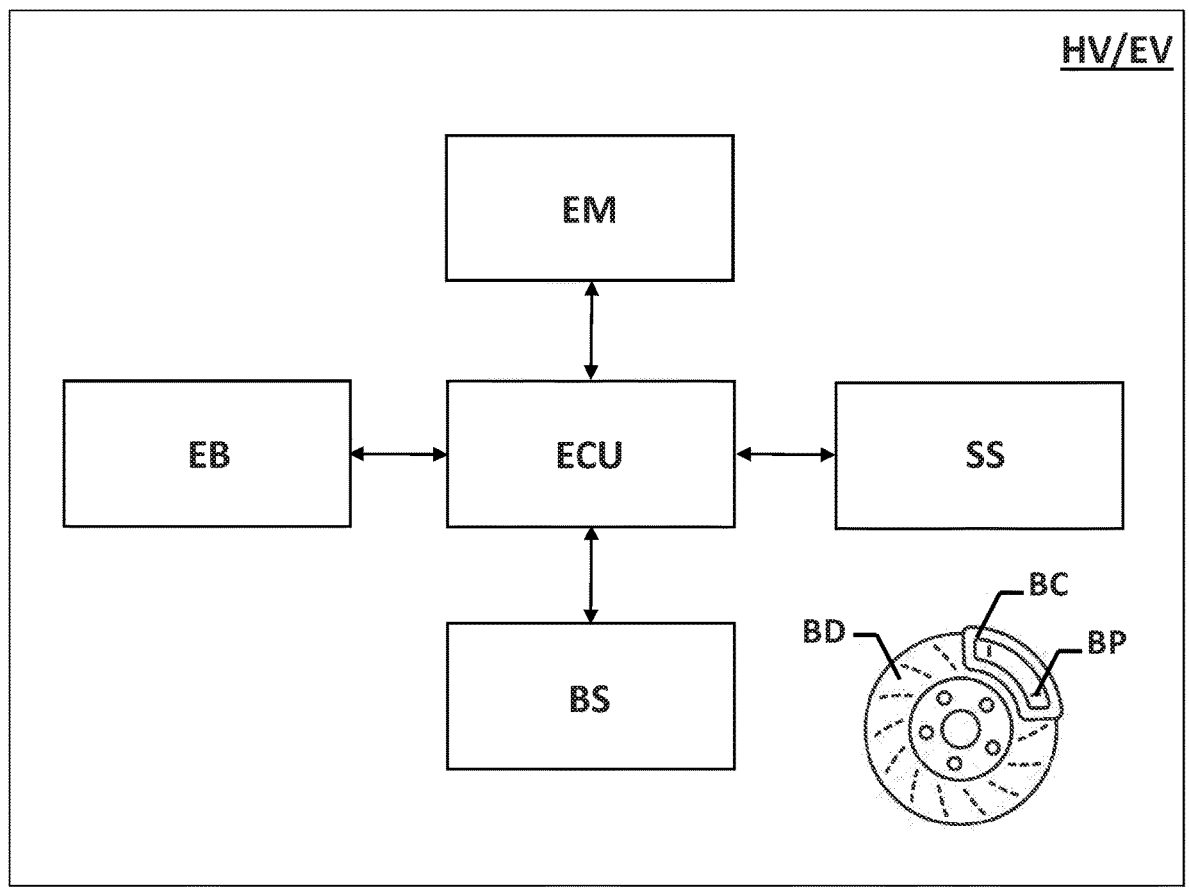
FIG. 1 shows a principle block diagram of a hybrid or fully electric vehicle equipped with an automotive electronic control system according to the present invention.

FIG. 1 schematically shows a hybrid or fully electric vehicle HV/EV comprising:

a conventional braking system BS based on friction bodies to brake the vehicle HV/EV due to interaction of the friction bodies in response to the operation of a brake pedal BP or another operationally equivalent control member, e.g., a control member on the steering wheel in vehicles HV/EV for impaired drivers, through which a driver can control the deceleration or slow-down of the vehicle HV/EV or can limit the acceleration, for example on downhill roads, along which the vehicle HV/EV would tend to accelerate, a reversible electric machine EM operatively coupled to the wheels W of the vehicle HV/EV and electronically controllable to operate selectively as an electric engine to propel the vehicle HV/EV and as an electric generator to convert the kinetic energy of the vehicle HV/EV into electrical energy during regenerative braking, an electrical energy accumulator in the form of an electric battery pack EB and electrically connected to the electric machine EM to store the electrical energy produced thereby when the electric machine EM operates as an electric generator during regenerative braking and to power the electric machine EM when it operates as an electric engine to propel the vehicle HV/EV, and an electronic control system comprising:
  a sensory system SS to measure, among others, automotive quantities necessary to implement the present invention and described in greater detail below, and
  an electronic control unit ECU, electrically connected to an electronic control unit of the conventional braking system BS, to the electric machine EM, to the brake pedal BP, and to the sensory system SS, typically through an on-board communication network of the vehicle HV/EV, for example CAN, FlexRAy or others, and programmed to control operation of the conventional braking system BS and of the electric machine EM in response to the operation of the brake pedal BP or of any other operationally equivalent control member, as described below in detail.

By way of example, FIG. 1 shows a conventional disc brake system BS, namely where each disc braking assembly BA comprises a brake disc BD and two brake pads BP arranged on opposite sides of the brake disc BD and carried by a floating brake caliper BC.

It goes without saying that what has been said about a disc braking assembly BA also applies to a drum braking assembly.

In hybrid vehicles HV, in particular those in which the electric machine EM is in the form of a belt-driven starter-generator BSG, the electronic control unit ECU is programmed to control operation of the electric machine EM to selectively perform one or more of the following functions:

Automatic Internal Combustion Engine Stop and Start (S&S), in which the electric machine EM is, if necessary, operated as an electric engine to restart the internal combustion engine (ICE) after it has been stopped under the control of the electronic control unit ECU or by another electronic control unit under certain driving conditions of the vehicle HV, Regenerative Braking (RB), in which the electric machine EM is, if necessary, operated as an electric generator to recover the kinetic energy of the vehicle HV during braking and transform it into electrical energy, Electric Power Assist-Torque Boost (or Motoring) (EPA), in which the electric machine EM is operated as an electric engine to generate, if necessary, mechanical power to supplement the one generated by the internal combustion engine (ICE), and Alternator (A), in which the electric machine EM is operated as an electric generator to generate electrical energy.

According to the present invention, the electronic control unit ECU is further programmed to perform a friction body cleaning function to clean the friction bodies of the conventional braking system BS. The friction body cleaning function comprises the steps of initially assessing the advisability of cleaning the friction bodies of the conventional braking system BS and, if this assessment has a positive outcome, of consequently controlling operation of the conventional braking system BS to clean the friction bodies of the conventional braking system BS, in the example considered in the form f the brake discs BD, to remove any dirt and rust so as to restore the braking performance and, therefore, the service life of the conventional braking system BS, in the manner described hereinafter in detail with reference to the flow chart shown in FIG. 2.

Figure 2:
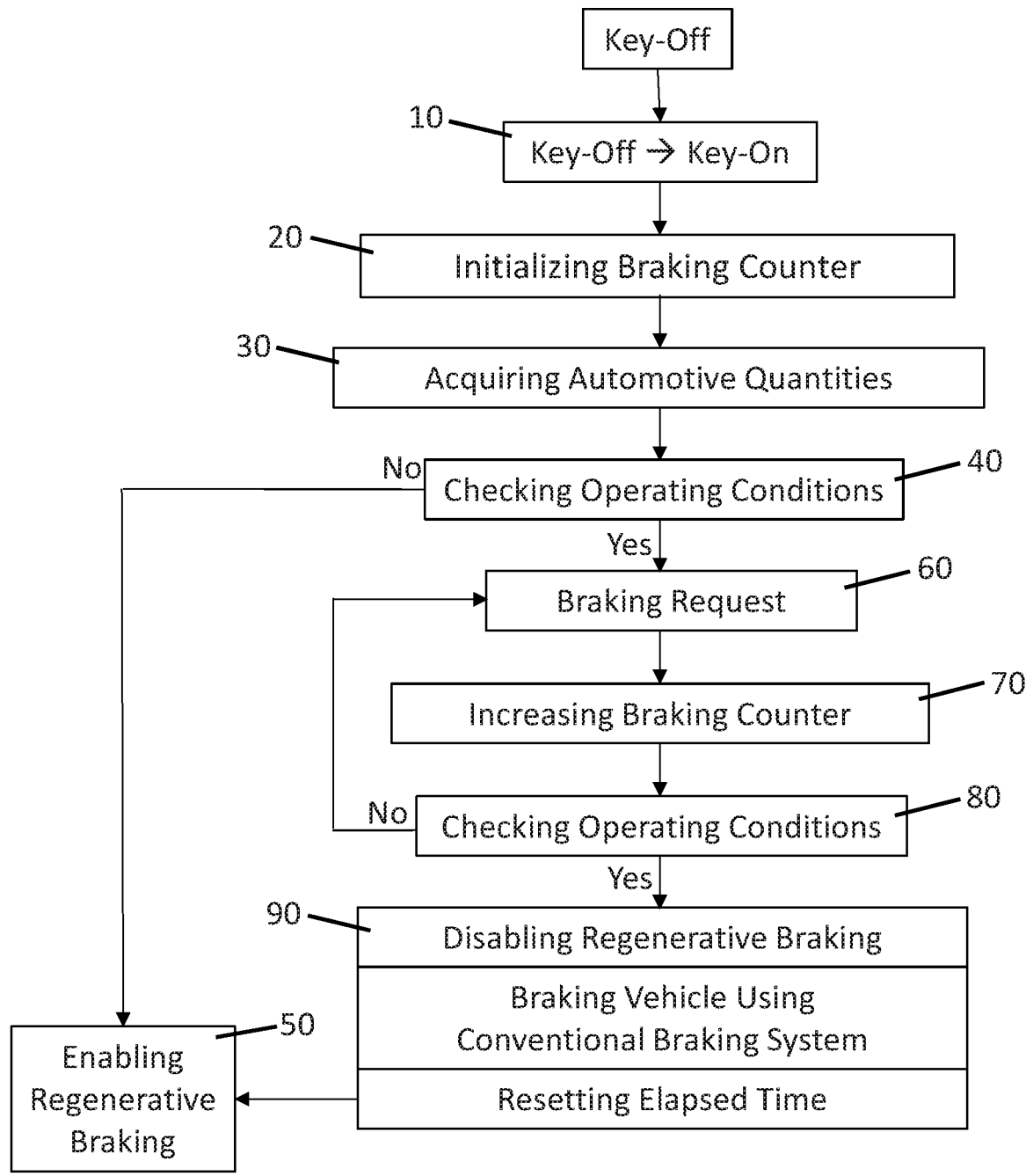
FIG. 2 shows a flow chart of the operations carried out by an automotive electronic control unit of the automotive electronic control system.

As shown in FIG. 2, the electronic control unit ECU is programmed to first detect occurrence of a transition between a so-called key-off condition and a so-called key-on condition (block 10), which depend on the type of electronic key of the vehicle HV/EV and substantially correspond to an OFF condition and, respectively, to an ON condition of the electric or internal combustion engine of the vehicle HV/EV.

In particular, in an electronic key provided with a mechanical key, the key-on condition is represented by a coded electronic key being recognized by the on-board computer of the vehicle HV/EV and in the mechanical key being mechanically inserted in the ignition block and in the ON position, while the key-off condition is represented by the ignition block being in the OFF position.

In an electronic key without a mechanical key or with a mechanical key that does not allow the engine to be stared, because it may be started by means of an engine start button, the key-on condition is simply represented by, when the engine is started, a coded electronic key being recognized by the on-board computer of the vehicle HV/EV and possibly either the key fob resting on a start-up enabling area or an end portion of the key fob being mechanically inserted into a corresponding start-up enabling seat. The key-off condition instead corresponds to the situation in which the recognition of the electronic key did not take place.

When occurrence of a transition from a key-off condition to a key-on condition is detected, the electronic control unit ECU is programmed to:

initializing a braking counter to a predetermined value, conveniently zero (block 20), and receiving from the on-board communication network of the vehicle HV/EV automotive quantities (block 30), based on which cleaning of the friction bodies BD of the conventional braking system BS of the vehicle HV/EV is controlled as described in detail here below, and in particular:

state of charge (SOC) of the electric battery pack EP of the vehicle HV/EV, driving mode, HV/EV which can be manually selected by the driver through a selector (manettino dial) in a group of available driving modes including, by way of example, "electric drive mode", "save energy mode", "sport mode", "city mode", etc.;

time elapsed since the last assessment of the advisability of cleaning the friction bodies of the conventional braking system BS, which can for example be counted in hours by means of a suitable counter, stop duration of the vehicle WV/EV, defined as the time elapsed between the transition from a key-on condition to a key-off condition and the subsequent transition from a key-off condition to a key-on condition, distance travelled by the vehicle HV/EV in a reference time period prior to the detected transition from the key-off condition to the key-on condition, and appropriately defined by the automotive manufacturer, e.g., the calendar day preceding the current calendar day in which the described operations take place, number of openings of a door of the vehicle HV/EV, conveniently the driver door, in a reference time period appropriately defined by the automotive manufacturer, e.g., the calendar day preceding the current calendar day, for example countable by means of a counter, and steering wheel angle.

Knowledge of the distance travelled by the vehicle HV/EV and of the number of openings of the driver door of the vehicle HV/EV in a reference time period allows an "average travel distance" to be determined between the openings of the driver door, which allows the type of use of the vehicle HV/EV by the driver to be determined.

The electronic control unit ECU is programmed to check whether the received automotive quantities meet given operating conditions that may be different for each vehicle manufacturer to achieve distinctive performances from those of other motor vehicle manufacturers (block 40).

By way of example, the electronic control unit ECU can be programmed to check whether:

the state of charge of the electric battery pack EP is within a predefined range, e.g., between 30% and 80%, the driving mode selected by means of the special selector belongs to a group of driving modes in which the cleaning of the friction bodies of the conventional braking system BS is considered feasible based on a proprietary criterion, the stop duration of the vehicle HV/EV is higher than a threshold value, e.g., 3 hours, the time elapsed since the last assessment of the advisability of cleaning the friction bodies of the conventional braking system BS is higher than a threshold value, e.g., 3 hours, the distance travelled by the vehicle HV/EV during the previous calendar day is lower than a threshold value, e.g., 40 km, and the number of openings of the driver door of the vehicle HV/EV during the previous calendar day is higher than a threshold value, e.g., 8.

If even only one of the operating conditions is determined not to be met, the electronic control unit ECU is programmed to enable regenerative braking via the reversible machine EM (block 50).

On the other hand, if all the operating conditions are determined to be met, the electronic control unit ECU is programmed to:

detect occurrence of a request by the driver of braking the vehicle HV/EV via the brake pedal BP or any equivalent control member (block 60), when occurrence of a request of braking the vehicle HV/EV is detected, increase the braking counter by one unit (block 70); and check whether the following operating conditions are met (block 80):

the driving mode selected by means of the special selector keeps on belong to a group of driving modes in which the cleaning of the friction bodies of the conventional braking system BS is considered feasible based on a given proprietary criterion, the count of the braking counter, which is indicative of the brakings performed by the conventional braking system BS, counted starting from the start-up of the vehicle HV/EV recognized based on the detection of the transition from the key-off condition to the key-on condition, is greater than or equal to a threshold value, for example ten, which is calibratable so as to avoid cleaning the friction bodies of the conventional braking system BS during the first brakings following the key-on of the vehicle HV/EV, which are with reasonable probability carried out at low speed, e.g., during exit manoeuvres from a parking lot or from a garage, in which the speed of the vehicle HV/EV is low and, as a result, any cleaning of the friction bodies of the conventional braking system BS would be useless and ineffective; and the steering wheel angle is smaller than or equal to a threshold value, for example 120°, since for larger steering wheel angles the speed of the vehicle HV/EV is usually low and any cleaning of the friction bodies of the conventional braking system BS would be useless and ineffective;

if even only one of the operating conditions is determined not to be met, return to block 60 to detect occurrence of a request by the driver of braking the vehicle HV/EV via the brake pedal BP or any equivalent control member; and if instead all the operating conditions are determined to be met, carry out the following operations (block 90):

disabling regenerative braking via the reversible machine EM, braking the vehicle HV/EV by using only the conventional braking system BS, and resetting the time elapsed since the last assessment of the advisability of cleaning the friction bodies of the conventional braking system BS.

When the braking of the vehicle HV/EV by using only the conventional braking system BS is determined to have been completed, enabling again the regenerative braking via the reversible machine EM (block 50).

The advantages that the present invention allows to achieve may be appreciated based on what has been described above.

In particular, the present invention allows the friction bodies of conventional motor vehicle braking systems to be cleaned in a much computationally simpler way compared to the prior art solutions described in the introductory part, thus having a lower impact on the exploitation of the computational resources of the on-board computers or the electronic control units of the motor vehicles compared to prior art solutions.

This is achieved through a preventive rather than a corrective strategy for cleaning the friction bodies of conventional brake systems, as instead occurs in the previously-described prior art solutions, which strategy is essentially based on the number of brakings performed by conventional braking systems counted from the previous implementation of the strategy for cleaning the friction bodies of conventional braking systems.

Moreover, the preventive strategy for cleaning the friction bodies of conventional brake systems is not based on complex estimation models based in turn on measured or estimated automotive or environmental quantities, such as the temperature of the brake discs or the external humidity, which models show significant limitations and often do not take into consideration actual data on the external environment, such as the external temperature or the local humidity or the proximity to salt water.

Furthermore, the strategy for cleaning the friction bodies of conventional preventive brake systems is not based on complex estimation models of the brake disc oxidation, which models have significant limitations and their use is likely to lead to a corrective strategy rather than to a preventive strategy. In this case, in fact, the driver would drive with a non-optimized regenerative braking system without any advantage in terms of energy savings or limitation of intrusiveness in terms of frequency and intensity of operation.

The invention claimed is:

1. An automotive electronic control system for a hybrid or fully electric vehicle comprising:
   a conventional braking system based on friction bodies to brake the vehicle by interaction of the friction bodies in response to operation of a brake,
   a reversible electric machine operatively coupled to wheels of the vehicle and electronically controllable to operate selectively as an electric engine to generate a mechanical power to propel the vehicle and as electric generator to convert kinetic energy of the vehicle into electrical energy, and
   an electrical energy accumulator electrically connected to the electric machine to store the electrical energy generated thereby when it is operated as an electric generator to convert the kinetic energy of the vehicle into electrical energy, and to electrically power the electric machine when it is operated as an electric engine to propel the vehicle;
   the automotive electronic control system is configured to control operation of the conventional braking system and of the electric machine in response to operation of the brake;
   the automotive electronic control system is further configured to control operation of:
      the electric machine to selectively perform one or more different functions comprising a regenerative braking, in which the electric machine is operated as an electric generator to recover the kinetic energy of the vehicle during braking and convert it into electrical energy; and
      the conventional braking system to perform a friction body cleaning function to clean the friction bodies of the conventional braking system, which function comprises determining whether the friction bodies of the conventional braking system should be cleaned and, controlling operation of the conventional braking system to clean the friction bodies of the conventional braking system to restore braking performance thereof;
   the automotive electronic control system is characterized by being configured to determine whether the friction bodies of the conventional braking system should be cleaned, based on a number of brakings performed by the conventional braking system counted during a predetermined time period or starting from a predefined event; and
   the automotive electronic control system is further configured to:
      receive one or more different vehicle status indicators,
      check whether the received vehicle status indicators meet one or more different first operating conditions,
      if all the first operating conditions are determined to be met, detect occurrence of a request of braking the vehicle,
      if a request of braking the vehicle is determined to have occurred, check whether the number of brakings performed by the conventional braking system during the predetermined time period or starting from the predefined event meets a second operating condition;
      wherein the second operating condition is defined by the number of brakings performed by the conventional braking system during the predetermined time period or starting from the predefined event being greater than or equal to a threshold value; and
      if the second operating condition is determined to be met:
         disable regenerative braking via the reversible machine, and
         brake the vehicle using only the conventional braking system.

2. The automotive electronic control system of claim 1, wherein the received vehicle status indicators comprise one or more of the following:
   state of charge of the electrical energy accumulator,
   driving mode of the vehicle,
   time elapsed since the last determination of whether the conventional braking system should be cleaned,
   stop duration of the vehicle,
   distance travelled by the vehicle during the predetermined time period or starting from the predefined event,
   number of openings of a door of the vehicle during the predetermined time period or starting from the predefined event, and
   steering wheel angle;
   and wherein checking whether the received vehicle status indicators meet one or more different first operating conditions includes checking whether:
      the state of charge of the electrical energy accumulator is within a predefined range,
      the driving mode belongs to a group of driving modes in which cleaning the friction bodies of the conventional braking system of the vehicle is considered feasible based on a predefined criterion, the stop duration of the vehicle is higher than a threshold value, the time elapsed since the last determination of whether the conventional braking system of the vehicle should be cleaned is greater than a threshold value, the distance travelled by the vehicle during the predetermined time period or starting from the predefined event is smaller than a threshold distance; and the number of openings of the door of the vehicle during the predetermined time period or starting from the predefined event is greater than a threshold value.

3. The automotive electronic control system of claim 1, further configured to:

if a request of braking the vehicle is determined to have occurred, check whether different vehicle status indicators, additional to the number of brakings performed by the conventional braking system, meet associated second operating conditions, and disable regenerative braking via the reversible machine, and brake the vehicle using only the conventional braking system if all the second operating conditions are determined to be met.

4. The automotive electronic control system of claim 3, wherein the second operating conditions associated to the different vehicle status indicators are defined by:

a driving mode belonging to a group of driving modes in which cleaning the friction bodies of the conventional braking system of the vehicle is considered feasible based on a predefined criterion, and a steering wheel angle that is smaller than or equal to a threshold value.

5. The automotive electronic control system of claim 1, further configured to:

detect occurrence of a transition from a key-off condition to a key-on condition, and acquire the one or more different vehicle status indicators upon detection of the occurrence of a transition from a key-off condition to a key-on condition.

6. The automotive electronic control system of claim 1, further configured to:

enable the regenerative braking via the reversible machine at the end of the braking of the vehicle performed using the conventional braking system or if at least one of the first operating conditions is not met.

7. A vehicle comprising:
the automotive electronic control system of claim 1.

8. An automotive electronic control system for a hybrid or fully electric vehicle comprising:

a conventional braking system based on friction bodies to brake the vehicle by interaction of the friction bodies in response to operation of a brake, a reversible electric machine operatively coupled to wheels of the vehicle and electronically controllable to operate selectively as an electric engine to generate a mechanical power to propel the vehicle and as electric generator to convert kinetic energy of the vehicle into electrical energy, and an electrical energy accumulator electrically connected to the electric machine to store the electrical energy generated thereby when it is operated as an electric generator to convert the kinetic energy of the vehicle into electrical energy, and to electrically power the electric machine when it is operated as an electric engine to propel the vehicle;

the automotive electronic control system is configured to control operation of the conventional braking system and of the electric machine in response to operation of the brake;

the automotive electronic control system is further configured to control operation of:

the electric machine to selectively perform one or more different functions comprising a regenerative braking, in which the electric machine is operated as an electric generator to recover the kinetic energy of the vehicle during braking and convert it into electrical energy; and the conventional braking system to perform a friction body cleaning function to clean the friction bodies of the conventional braking system, which function comprises determining whether the friction bodies of the conventional braking system should be cleaned and controlling operation of the conventional braking system to clean the friction bodies of the conventional braking system to restore braking performance thereof;

the automotive electronic control system is characterized by being configured to determine whether the friction bodies of the conventional braking system should be cleaned, based on a number of brakings performed by the conventional braking system counted during a predetermined time period or starting from a predefined event; and the automotive electronic control system is further configured to:

receive one or more different vehicle status indicators, check whether the received vehicle status indicators meet one or more different first operating conditions, if all the first operating conditions are determined to be met, detect occurrence of a request of braking the vehicle, if a request of braking the vehicle is determined to have occurred, check whether the number of brakings performed by the conventional braking system during the predetermined time period or starting from the predefined event meets a second operating condition;

wherein the second operating condition is defined by the number of brakings performed by the conventional braking system during the predetermined time period or starting from the predefined event being greater than or equal to a threshold value; and wherein the received vehicle status indicators comprise one or more of the following:

state of charge of the electrical energy accumulator, driving mode of the vehicle, time elapsed since the last determination of whether the conventional braking system should be cleaned, stop duration of the vehicle, distance travelled by the vehicle during the predetermined time period or starting from the predefined event, number of openings of a door of the vehicle during the predetermined time period or starting from the predefined event, and steering wheel angle;

and wherein checking whether the received vehicle status indicators meet one or more different first operating conditions includes checking whether:

the state of charge of the electrical energy accumulator is within a predefined range, the driving mode belongs to a group of driving modes in which cleaning the friction bodies of the conventional braking system of the vehicle is considered feasible based on a predefined criterion, the stop duration of the vehicle is higher than a threshold value, the time elapsed since the last determination of whether the conventional braking system of the vehicle should be cleaned is greater than a threshold value, the distance travelled by the vehicle during the predetermined time period or starting from the predefined event is smaller than a threshold distance; and the number of openings of the door of the vehicle during the predetermined time period or starting from the predefined event is greater than a threshold value.

9. An automotive electronic control system for a hybrid or fully electric vehicle comprising:

a conventional braking system based on friction bodies to brake the vehicle by interaction of the friction bodies in response to operation of a brake, a reversible electric machine operatively coupled to wheels of the vehicle and electronically controllable to operate selectively as an electric engine to generate a mechanical power to propel the vehicle and as electric generator to convert kinetic energy of the vehicle into electrical energy, and an electrical energy accumulator electrically connected to the electric machine to store the electrical energy generated thereby when it is operated as an electric generator to convert the kinetic energy of the vehicle into electrical energy, and to electrically power the electric machine when it is operated as an electric engine to propel the vehicle;

the automotive electronic control system is configured to control operation of the conventional braking system and of the electric machine in response to operation of the brake;

the automotive electronic control system is further configured to control operation of:

the electric machine to selectively perform one or more different functions comprising a regenerative braking, in which the electric machine is operated as an electric generator to recover the kinetic energy of the vehicle during braking and convert it into electrical energy; and the conventional braking system to perform a friction body cleaning function to clean the friction bodies of the conventional braking system, which function comprises determining whether the friction bodies of the conventional braking system should be cleaned and controlling operation of the conventional braking system to clean the friction bodies of the conventional braking system to restore braking performance thereof;

the automotive electronic control system is characterized by being configured to determine whether the friction bodies of the conventional braking system should be cleaned, based on a number of brakings performed by the conventional braking system counted during a predetermined time period or starting from a predefined event; and the automotive electronic control system is further configured to:

if a request of braking the vehicle is determined to have occurred, check whether different vehicle status indicators, additional to the number of brakings performed by the conventional braking system, meet associated second operating conditions, disable regenerative braking via the reversible machine, and brake the vehicle using only the conventional braking system if all the second operating conditions are determined to be met, and wherein the second operating conditions associated to the different vehicle status indicators are defined by:

a driving mode belonging to a group of driving modes in which cleaning the friction bodies of the conventional braking system of the vehicle is considered feasible based on a predefined criterion; and a steering wheel angle that is smaller than or equal to a threshold value.

* * * * *